Dec. 28, 1965  J. R. BRADEN  3,226,136
BULKHEAD PIPE SUPPORT
Filed Dec. 26, 1963  3 Sheets-Sheet 1

INVENTOR.
JOHN R. BRADEN
BY
ATTY.

Dec. 28, 1965  J. R. BRADEN  3,226,136
BULKHEAD PIPE SUPPORT
Filed Dec. 26, 1963  3 Sheets-Sheet 2

INVENTOR.
JOHN R. BRADEN
BY *D. E. Hodges*
ATTY.

Dec. 28, 1965  J. R. BRADEN  3,226,136
BULKHEAD PIPE SUPPORT

Filed Dec. 26, 1963  3 Sheets-Sheet 3

INVENTOR.
JOHN R. BRADEN
BY
ATTY.

United States Patent Office 3,226,136
Patented Dec. 28, 1965

3,226,136
BULKHEAD PIPE SUPPORT
John R. Braden, Annapolis, Md., assignor to the United States of America as represented by the Secretary of the Navy
Filed Dec. 26, 1963, Ser. No. 333,771
1 Claim. (Cl. 285—158)
(Granted under Title 35, U.S. Code (1952), sec. 266)

The invention described herein may be manufactured and used by or for the Government of the United States of America for governmental purposes without the payment of any royalties thereon or therefor.

The present invention relates to a penetration fitting for a bulkhead, wall, partition, or the like. More specifically, the present invention provides a novel penetration fitting which will support a pipe passing through a bulkhead so as to attenuate any vibrations emanating from the pipe while providing a fluid tight seal between the pipe and the bulkhead. While the penetration fitting will be described hereinafter as installed in a bulkhead on a ship, it should be understood that it could be effectively employed wherever it is desired to dampen the vibrations of a pipe passing through a partition, while providing a fluid tight seal between the pipe and partition.

Where a pipe extends through a bulkhead on a ship, it is essential that there be effective fluid tight sealing between the pipe and the bulkhead so that a build-up of fluid pressure on one side of the bulkhead will not cause fluid leakage between the pipe and the bulkhead into the area on the opposite side of the bulkhead. On most ships, at present, this is accomplished by welding the pipe to the bulkhead. While this structure provides effective sealing, any vibrations emanating from the pipe will be readily transmitted to the bulkhead causing structureborne noise. This noise is undesirable both because it is unpleasant to shipboard personnel, and because it is easily transmitted through water and picked up by enemy vessels that are equipped to determine the ship's position from such noise. Furthermore, if the pipe is welded to the bulkhead, it cannot be rotated, angularly deflected, nor longitudinally moved in the bulkhead. The use of a packing gland between the pipe and bulkhead is also ineffective as a vibration attenuator because in order to provide an effective high pressure seal, so much compression must be applied to the packing that it will readily transmit vibration and noise from the pipe. Thus, there is a well recognized need for a penetration fitting which will both provide an effective fluid seal and dampen the pipe vibrations.

It is an object of this invention to provide a bulkhead penetration fitting which will dampen the vibrations of a pipe passing through the bulkhead while providing effective fluid tight sealing between the pipe and the bulkhead.

It is another object of this invention to provide a fluid tight, vibration dampening bulkhead penetration fitting which will permit a pipe passed therethrough to be rotated, angularly deflected, and/or longitudinally moved in the bulkhead.

It is a further object of this invention to provide a fluid tight, vibration dampening bulkhead penetration fitting which will permit a pipe supported in said fitting to be moved rotationally, angularly, and longitudinally in the bulkhead, and which will reinforce the aperture in the bulkhead through which the pipe passes.

Other objects and many of the attendant advantages of this invention will be readily appreciated as the same becomes better understood by reference to the following detailed description when considered in connection with the accompanying drawings, in which like reference numerals designate like parts throughout the figures thereof, and wherein.

Figure 1:
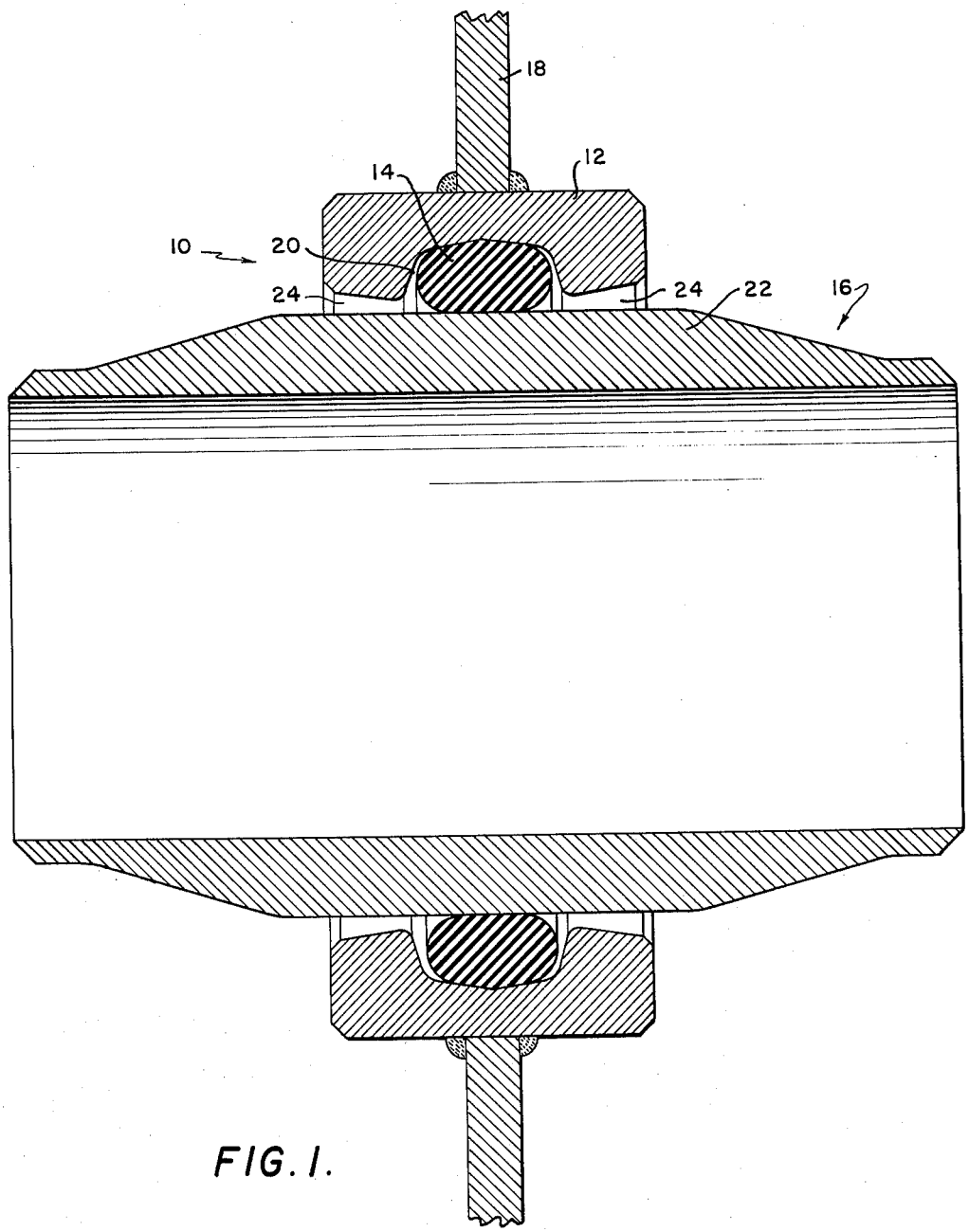
FIG. 1 is a sectional plan view of one embodiment of a bulkhead penetration fitting constructed in accordance with this invention, with a pipe passing therethrough.

In FIG. 1 there is shown generally a penetration fitting 10 which includes a cylindrical housing member 12, and a resilient sealing ring 14 disposed between the housing member and a pipe 16 which is passed therethrough. Housing member 12 is welded on its outer surface to a bulkhead, wall, or partition 18, and is provided with a circular groove 20 in its inner surface in which the sealing ring 14 fits. The sealing ring must be lightly loaded and soft enough to attenuate structureborne noise, and yet it must seal the opening between the pipe and the bulkhead. A 55–60 durometer hardness neoprene synthetic rubber is an effective material for the sealing ring. The ring may be made by molding the material to the required size and shape, or by wrapping a length of material of the proper cross-sectional shape around the pipe and butting the ends together. Within the housing member 12, at either end, there is an annular gap 24 between the inner surface of the housing member and the outer surface of the pipe.

To assemble the fitting 10, housing member 12 is first welded to the aperture in bulkhead 18, which reinforces the aperture and provides a fluid tight seal between the bulkhead and the housing. Next, the sealing ring 14 is inserted in the groove 20, and the pipe 16 is passed through the sealing ring. The pipe 16 includes a special section of pipe 22 where it passes through the fitting 10 for facilitating assembly and disassembly of the structure. When the part of the pipe 16 having a special section 22 is inserted through the sealing ring 14, the sealing ring will be radially compressed slightly; that is, enough to maintain contact with and provide a low pressure seal between the housing member and pipe. The sealing ring is now soft enough to dampen vibrations from the pipe and allow rotational, angular, or longitudinal movement of the pipe in the fitting.

Figure 2:
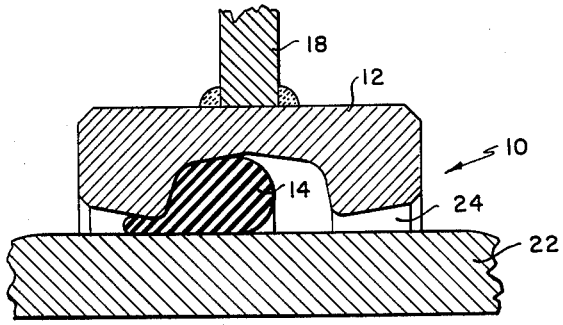
FIG. 2 shows the fitting of FIG. 1 when a high fluid pressure is applied against one side of the bulkhead.

In operation, when the fluid pressure on one side of bulkhead 18 increases with respect to the pressure on the opposite side, it will force sealing ring 14 against the annular gap 24 at the low pressure end of housing 12 (as shown in FIG. 2). This will compress the ring 14 and provide a high pressure seal between the pipe and the housing. The composition of the sealing ring material, and the size of annular gaps 24 are such that the sealing ring cannot be forced out of the housing member 12 through the annular gaps.

Figure 3:
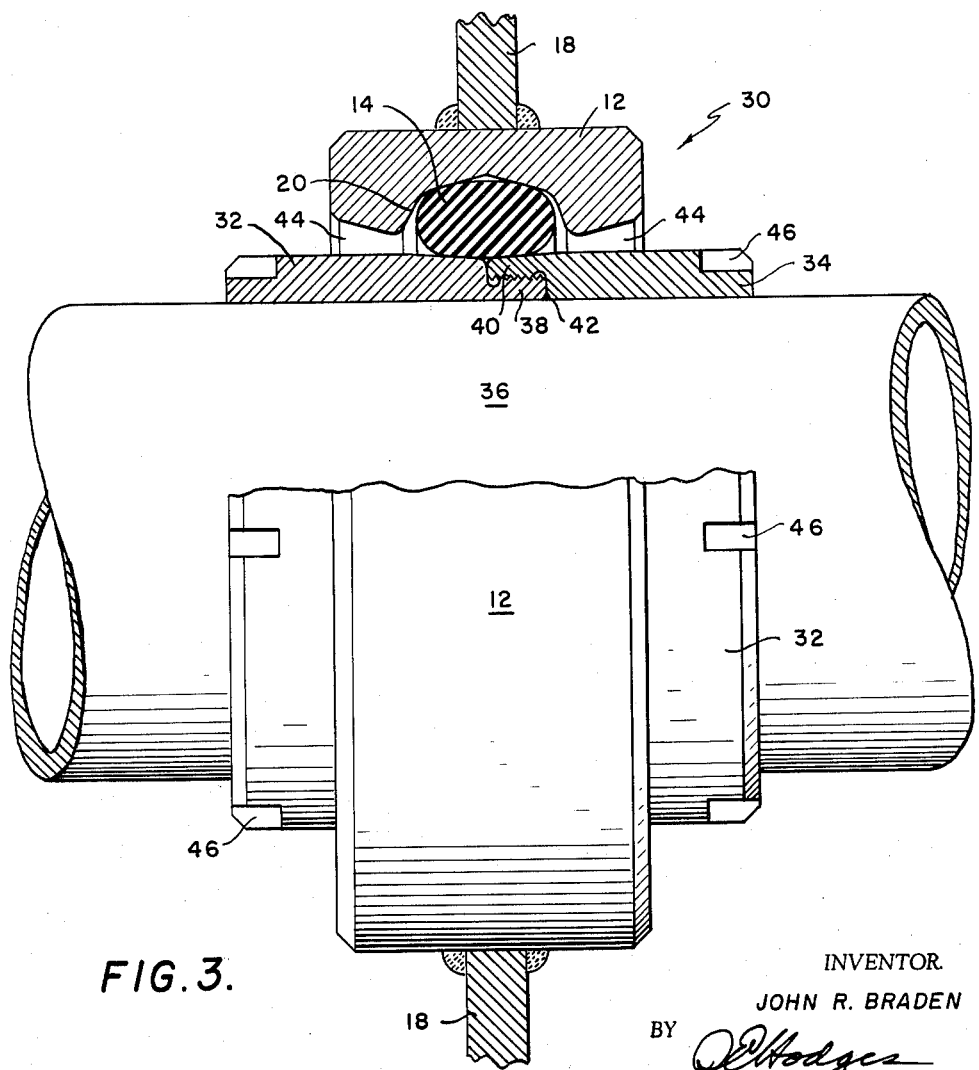
FIG. 3 is a sectional plan view of another embodiment of the invention.

Fitting 30, shown in FIG. 3, differs from the fitting 10 of FIG. 1 by providing a pair of attachable cylindrical sleeves 32, 34 for encasing pipe 36 where the pipe passes through bulkhead 18. These sleeves obviate the need for the special section of pipe (22 in FIG. 1). Sleeves 32, 34 serve the same purpose as the special section of pipe 22 in FIG. 1 serves; namely, to facilitate assembly and disassembly of the structure. Sleeve 32 has an extension 38 which is threaded externally and cooperates with an internally threaded extension 40 on sleeve 34 to detachably secure the sleeves together end to end. To prevent leakage of fluid between pipe 36 and sleeves 32, 34, the inner edges of extension 38 and sleeve 34 are chamfered and cooperate to compress a metallic sealing ring 42 between themselves and the pipe 36. The metallic sealing ring could be, for example, a relatively soft copper ring. Annular gaps 44 appear within the housing member 12, at either end thereof, between the inner surfaces of the housing member and the outer surfaces of the sleeves 32, 34. Grooves 46 may be provided in sleeves 32, 34 to receive a wrench to facilitate attaching the sleeves to one another.

To assemble fitting 30, the housing member 12 is first welded to the aperture in the bulkhead 18. Next the sealing ring 14 is inserted in the groove 20 in the inner surface of the housing member, and the pipe 36 with a metallic ring 42 thereon is inserted into the housing member. Sleeves 32 and 34 are now placed on either end of pipe 36 with their extensions 38 and 40 facing one another. The sleeves are moved along the pipe toward one another until they make contact. Now the sleeves are rotated to screw extension 38 into extension 40. When the ends of the extensions abut against the ends of the sleeves, and the sleeves can no longer be rotated, sealing ring 14 is lightly compressed radially between sleeves 32, 34 and housing member 12. Sealing ring 14 will now dampen vibrations of pipe 36 and sleeves 32, 34, will provide a low pressure seal between the housing member and the pipe, and will permit rotational, angular, or longitudinal movement of the pipe in the fitting. Metallic sealing ring 42 is tightly compressed and forms a high pressure seal between sleeves 32, 34 and pipe 36.

In operation, a fluid pressure build-up on one side of bulkhead 18 will force sealing ring 14 against the annular gap 44 on the low pressure end of housing member 12, in the same manner that the sealing ring 14 in FIG. 2 is forced against gap 24. High pressure seals now exist between the housing member and the sleeves, and between the sleeves and the pipe.

Figure 4:
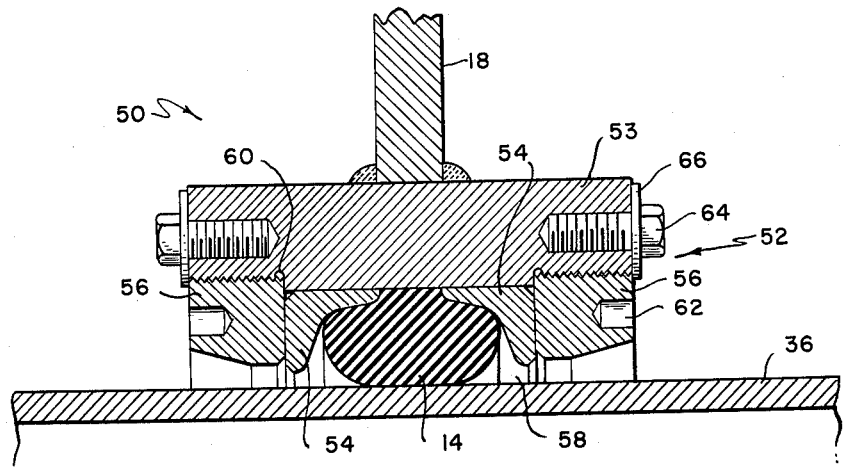
FIG. 4 is a sectional plan view of still another embodiment of the invention.

In FIG. 4 there is shown a penetration fitting 50, which is similar to fittings 10 and 30 of FIGS. 1 and 2. Cylindrical housing 52 includes an annular casing 53, compression rings 54, and locking rings 56. Annular casing 53 has an outer surface which is welded to bulkhead 18, and an inner surface which has a smooth center section and is threaded at both ends. Resilient sealing ring 14 is held within the smooth portion of the inner surface of casing 53 by compression rings 54 and locking rings 56. The locking rings 56 are threaded externally to cooperate with the internally threaded ends of casing 53 to secure the locking rings in the ends of the casing. The inner diameter of the smooth center section of casing 53 should be smaller than the inner diameter of the threaded end portions to provide a shoulder 60 on either end of the smooth center section against which the inner ends of the locking rings abut. The presence of shoulders 60 is important in that they limit the possible inward movement of the locking rings, thereby preventing any more than a predetermined amount of compressive force to be applied against resilient sealing ring 14. Annular gaps 58 are present on either side of sealing ring 14, between the inner surfaces of rings 54 and the pipe 36. Locking rings 56 may be drilled, as at 62, to receive a spanner wrench for easy assembly. Nuts 64 and washers 66 may be employed to prevent locking rings 56 from backing out of housing 52. To this end, washers 66 must be large enough to overlap the outer edges of locking rings 56.

Figure 5:
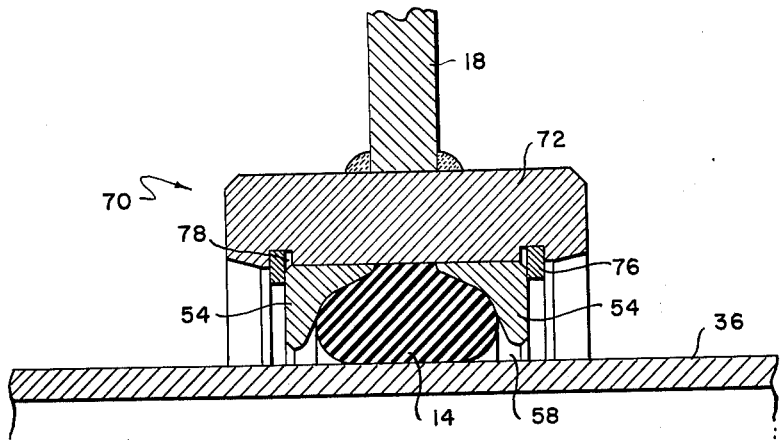
FIG. 5 is a sectional plan view of a still further embodiment of the invention.

Fitting 70, shown in FIG. 5 differs from fitting 50 (FIG. 4) only by employing snap rings 76, in place of locking rings 56, to hold the compression rings 54 and the resilient sealing ring 14 in position. To this end, the annular casing 72 is provided with circular grooves 78 for sealing the snap rings. These grooves, by their predetermined position, also limit the amount of compressive force that the snap rings can exert on sealing ring 14.

To assemble the fittings 50 and 70, the annular casing is first welded to the aperture in bulkhead 18, thereby reinforcing the aperture wall, and providing a fluid tight seal between the casing and the bulkhead. Next, the pipe 36, sealing ring 14, and compression rings 54 are inserted within the annular casing and the locking rings or snap rings are positioned to hold the assembly in place. Pipe 36 has a diameter which is slightly larger than the inner diameter of sealing ring 14. Therefore, when fittings 50 and 70 are assembled sealing ring 14 will be lightly compressed between the pipe and the housing; thereby permitting it to provide a low pressure fluid seal between the housing and the pipe, to dampen vibrations of the pipe, and to allow rotational, angular, or longitudinal movement of the pipe in the sealing ring. If fitting 50 is used, bolt 64 and washer 66 will now be secured in place. Any pressure build-up on one side of the bulkhead 18 will now force the sealing ring 14 against the annular gap 58 on the low pressure side of the bulkhead, in the same manner as shown in FIG. 2.

Obviously, many modifications and variations of the present invention are possible in the light of the above teachings. It is therefore to be understood, that within the scope of the appended claim, the invention may be practiced otherwise than as specifically described.

What is claimed is:

Fluid sealing and vibration attenuating means for use between a pipe and the peripheral wall of an aperture in a bulkhead through which the pipe extends, comprising:

an annular housing having an outer surface adapted to be welded to the peripheral wall of an aperture in a bulkhead, and an inner surface having a circular channel therein which is substantially U-shaped in cross-section, said housing comprising a single element;

a resilient sealing ring disposed in said circular channel, extending radially inwardly from said channel, and having its inner edge spaced inwardly of the innermost surfaces of said housing;

two cylindrical sleeves secured to one another at their ends, coaxially disposed within said resilient sealing ring;

the outer diameter of said sleeves being slightly greater than the inner diameter of said resilient sealing ring, whereby said sealing ring is lightly compressed radially between said sleeves and said annular housing;

a pipe coaxially encased by said sleeves; and a metallic sealing ring disposed between said sleeves and said pipe to provide a high pressure, fluid tight seal therebetween.

References Cited by the Examiner

UNITED STATES PATENTS

| | | | |
|---|---|---|---|
| 2,062,400 | 12/1936 | Dann | 285—158 |
| 2,444,113 | 6/1948 | Pevney | 285—158 |
| 2,472,029 | 5/1949 | Thiry | 248—358 |
| 2,499,024 | 2/1950 | Hollyday | 285—356 X |
| 2,538,683 | 1/1951 | Guiler | 285—321 X |
| 2,635,931 | 4/1953 | May | 285—190 X |
| 2,639,313 | 5/1953 | Street | 339—103 |
| 2,706,126 | 4/1955 | Thiry | 248—358 X |
| 2,709,349 | 5/1955 | Kuehn | 285—81 X |
| 2,749,154 | 6/1956 | Smith | 285—356 X |
| 2,828,980 | 4/1958 | Craig | 285—231 X |
| 2,893,756 | 7/1959 | Sundstrom | 285—158 |
| 2,958,548 | 11/1960 | DeVienne et al. | 285—158 |
| 3,055,972 | 9/1962 | Peterson | 285—348 X |
| 3,076,668 | 2/1963 | Famely | 16—2 |

FOREIGN PATENTS

| | | |
|---|---|---|
| 730,756 | 8/1932 | France. |
| 782,322 | 6/1935 | France. |
| 916,461 | 1/1963 | Great Britain. |

CARL W. TOMLIN, Primary Examiner.

DONLEY J. STOCKING, Examiner.

R. GIANGIORGI, Assistant Examiner.